(12) United States Patent
Walters

(10) Patent No.: US 8,826,773 B2
(45) Date of Patent: Sep. 9, 2014

(54) MIDDLE WEB CRANKSHAFT HAVING FORGED STRESS RELIEF

(75) Inventor: Steven K. Walters, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 101 days.

(21) Appl. No.: 13/482,081

(22) Filed: May 29, 2012

(65) Prior Publication Data

US 2013/0319173 A1    Dec. 5, 2013

(51) Int. Cl.
*F16C 3/04*    (2006.01)

(52) U.S. Cl.
USPC .......................................................... 74/603

(58) Field of Classification Search
USPC ........................................ 74/595, 596, 603
See application file for complete search history.

(56) References Cited

U.S. PATENT DOCUMENTS

| | | | | |
|---|---|---|---|---|
| 3,064,496 A | * | 11/1962 | Fritz | .................................. 74/596 |
| 3,704,636 A | | 12/1972 | Piech | |
| 3,824,659 A | * | 7/1974 | Sommer | .......................... 74/605 |
| 5,408,745 A | | 4/1995 | Tomiyama et al. | |
| 6,561,142 B2 | | 5/2003 | Moteki et al. | |
| 2008/0229877 A1 | | 9/2008 | Iwasaki et al. | |
| 2010/0083791 A1 | | 4/2010 | Guerreiro et al. | |
| 2010/0146753 A1 | | 6/2010 | Reeb et al. | |
| 2010/0326235 A1 | * | 12/2010 | Kilbon | ............................. 74/595 |

FOREIGN PATENT DOCUMENTS

| | | | | |
|---|---|---|---|---|
| DE | 19916492 | | 10/2000 | |
| DE | 102004040565 | | 3/2006 | |
| DE | 10200404050565 | * | 3/2006 | ............... F16C 3/06 |
| JP | 60106641 | | 6/1985 | |
| WO | 2006057593 | | 6/2006 | |

OTHER PUBLICATIONS

International Search Report and Written Opinion of PCT/US2013/038631 dated Aug. 15, 2013.

* cited by examiner

*Primary Examiner* — Vicky Johnson
(74) *Attorney, Agent, or Firm* — Rankin, Hill & Clark LLP

(57) ABSTRACT

A forged crankshaft includes a plurality of main journals, a plurality of crank pin journals rotatable in a circular path about axes defined by the main journals, and a plurality of crank webs. At least one crank web of the plurality of crank webs defines a middle crank web which is located between and connects two neighboring crank pin journals of the plurality of crank pin journals. The middle crank web has a stress relief forged therein, which is defined by first and second spaced sidewalls, an inner wall and a base wall. The forged-in stress relief has a predetermined depth, wrap angle, radius, and undercut which together define a shape of the forged-in stress relief. The shape of the forged-in stress relief is controlled to reduce stress in the crankshaft.

16 Claims, 6 Drawing Sheets

MIDDLE WEB CRANKSHAFT HAVING FORGED STRESS RELIEF

BACKGROUND

Exemplary embodiments herein generally relate to a crankshaft, and more particularly, to a middle web crankshaft having a forged stress relief.

Currently many OEMs use forged crankshafts for engines. One type of crankshaft is a middle web crankshaft that has at least one full crank web located between and connecting two neighboring pins. With this type of crankshaft, there is a pin to pin overlap area and a pin to journal overlap area. The stiffness and strength of the middle web crankshaft is dependent on the amount of overlap that can be achieved for the pin to pin overlap area and the pin to journal overlap area. However, most times the pin to pin overlap area and the pin to journal overlap area are not balanced causing uneven stress concentration in the crankshaft. When the strength of the forged crankshaft is an issue, the material strength of the crankshaft typically needs to be adjusted to achieve the required safety factory. For example, it is known to machine a stress notch or stress relief groove into a crank web of the crankshaft for distributing stresses. However, this stress notch or stress relief groove generally only reduces stress in one isolated area of the crankshaft and the additional machining step increases the manufacturing costs associated with the crankshaft.

BRIEF DESCRIPTION

In accordance with one aspect, a forged crankshaft comprises a first end adapted for connection to an associated pulley and a second end adapted for connection to an associated flywheel, a plurality of main journals, a plurality of crank pin journals rotatable in a circular path about axes defined by the main journals, and a plurality of crank webs. At least one crank web of the plurality of crank webs defines a middle crank web which is located between and connects two neighboring crank pin journals of the plurality of crank pin journals. The middle crank web has a stress relief forged therein. The forged-in stress relief is defined by first and second spaced sidewalls, an inner wall and a base wall. The forged-in stress relief has a predetermined depth, wrap angle, radius, and undercut which together define a shape of the forged-in stress relief. The shape of the forged-in stress relief is controlled to reduce stress in the crankshaft.

In accordance with another aspect, a forged crankshaft comprises a first end adapted for connection to an associated pulley and a second end adapted for connection to an associated flywheel, a plurality of main journals, a plurality of crank pin journals rotatable in a circular path about axes defined by the main journals, and a plurality of crank webs. One of the crank webs located adjacent the first end defines a first middle crank web and one of the crank webs located adjacent the second end defines a second middle crank web. Each of the first and second middle crank webs is located between and connecting two neighboring crank pin journals of the plurality of crank pin journals. At least one of the first and second middle crank webs has a stress relief forged therein. The forged-in stress relief is defined by first and second spaced sidewalls, an inner wall and a base wall. The forged-in stress relief has predetermined parameters, which are depth, wrap angle, radius and undercut. The wrap angle of the stress relief is an angular distance the stress relief extends around one of the neighboring crank pins connected to the middle crank having the stress relief. The radius of the stress relief is defined by the inner wall. The undercut of the stress relief is provided at the intersection of the inner wall and the base wall. The parameters together define a shape of the forged-in stress relief. The shape of the forged-in stress relief is controlled to reduce stress in the crankshaft.

In accordance with yet another aspect, a method of increasing bending and torsion strength of a forged crankshaft comprising providing a forged-in stress relief on a crank web of the crankshaft which is located between and connecting two neighboring crank pin journals of the crankshaft; controlling a shape of the forged-in stress relief by controlling a depth, wrap angle, radius and undercut defined by the forged-in stress relief; and locating the forged in stress relief in an overlap area defined by the neighboring crank pin journals.

DETAILED DESCRIPTION

It should, of course, be understood that the description and drawings herein are merely illustrative and that various modifications and changes can be made in the structures disclosed without departing from the present disclosure. In general, the figures of the exemplary middle web crankshaft are not to scale. It will also be appreciated that the various identified components of the exemplary middle web crankshaft disclosed herein are merely terms of art that may vary from one manufacturer to another and should not be deemed to limit the present disclosure.

Figure 1:
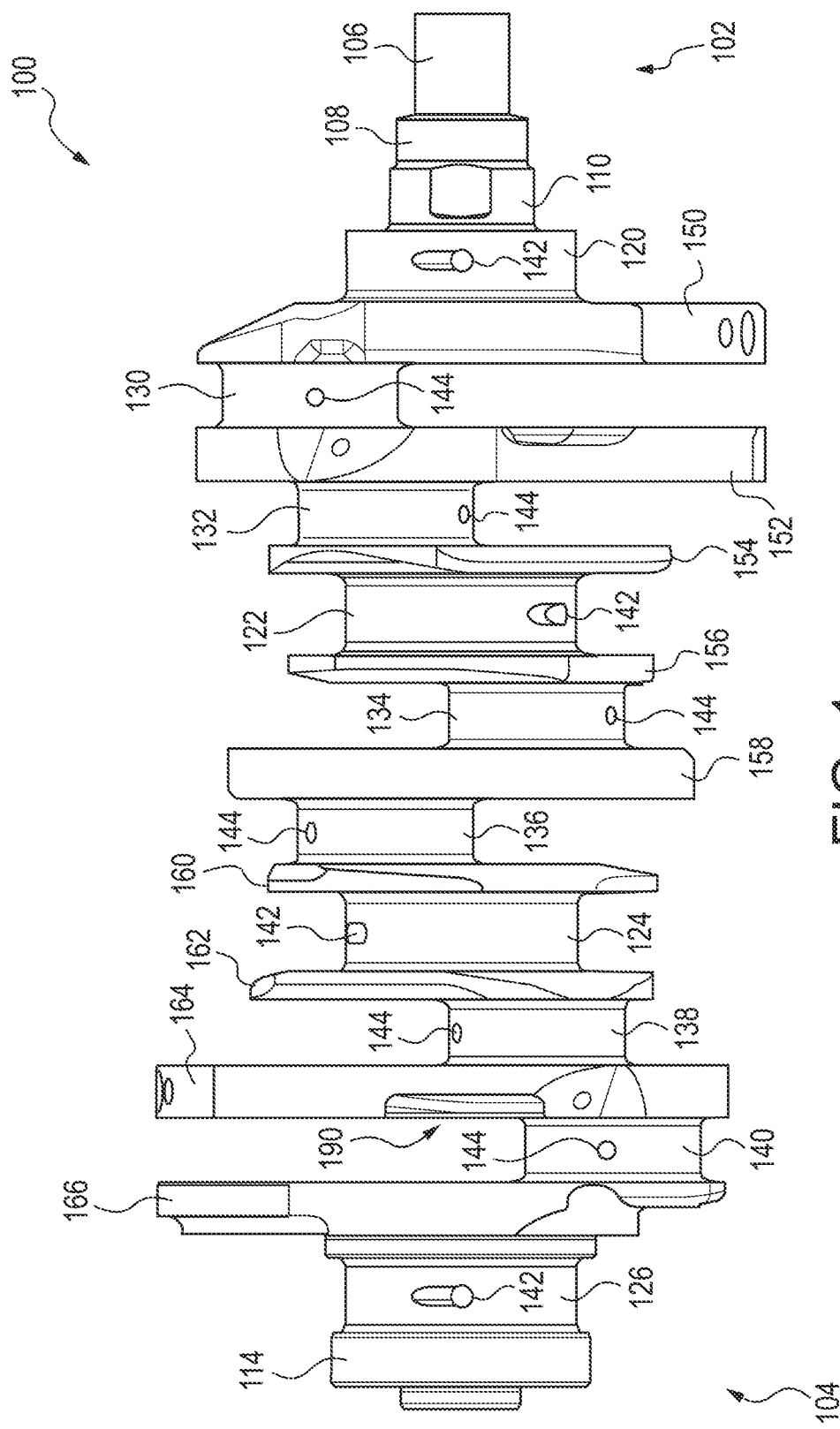
FIG. 1 is a side view of an exemplary middle web crankshaft having a crank web located between and connecting two neighboring crank pin journals, the crank web having a forged-in stress relief.
Figure 9:
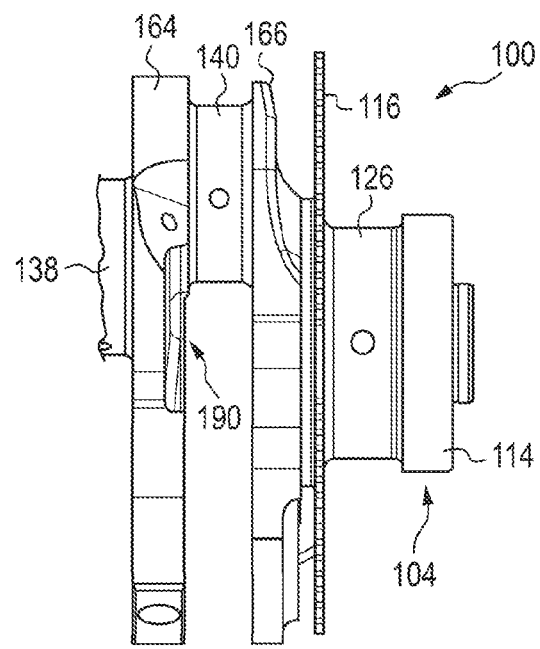
FIG. 9 is a partial side view of the crank web of the crankshaft of FIG. 1 having the forged-in stress relief.

Referring now to the drawings, wherein like numerals refer to like parts throughout the several views, FIG. 1 illustrate a forged crankshaft 100 comprising a first end 102 and a second end 104. The first end 102 includes a crank nose 106 adapted for connection to a pulley (not shown). Provided on the crank nose 106 is a mount 108 for a drive sprocket 110. The second end 104 of the crankshaft 100 includes a flywheel mounting flange 114 adapted for connection to a flywheel 116 (FIGS. 9 and 10). The crankshaft 100 includes a plurality of main journals 120,122,124,126, and a plurality of crank pin journals 130,132,134,136,138,140, each crank pin journal having an axis offset from respective axes of the plurality of main journals. The plurality of main journals 120,122,124,126 rotate via main bearings (not shown) which, in turn, cause the plurality of crank pin journals 130,132,134,136,138,140 to rotate in a circular path about the axes defined by the main journals. Each of the main journals includes an oil way 142 for the passage of lubricant to the crank pin journals, and each of the crank pin journals includes an oil hole 144.

The crankshaft 100 further includes a plurality of crank webs 150,152,154,156,158,160,162,164,166 provided between the first end 102 and the second end 104 of the crankshaft 100. Each of crank webs 150,152,164,166 can also be referred to as a counterweight. As shown, adjacent crank webs are in spaced relation via one of a main journal and a crank pin journal. Particularly, crank pin journal 130 is located between crank webs 150,152; crank pin journal 132 is located between crank webs 152,154; main journal 122 is located between crank webs 154,156; crank pin journal 134 is located between crank webs 156,158; crank pin journal 136 is located between crank webs 158, 160; main journal 124 is located between crank webs 160,162; crank pin journal 138 is located between crank webs 162,164; and crank pin journal 140 is located between crank webs 164,166. One of the crank webs located adjacent the first end 102 defines a first middle crank web and one of the crank webs located adjacent the second end 104 defines a second middle crank web. Specifically, crank web 152 defines the first middle crank web and crank web 164 defines the second middle crank web. Each of the first and second middle crank webs 152,164 is located between and connecting two neighboring crank pin journals of the plurality of crank pin journals.

Figure 2:
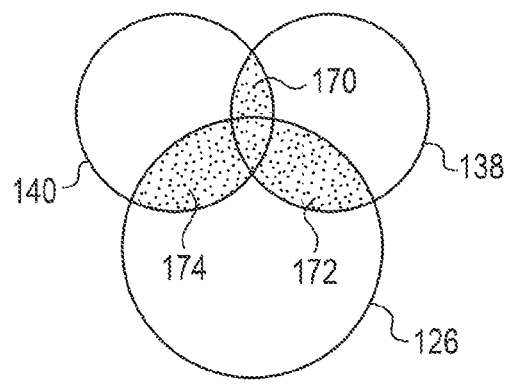
FIG. 2 is a schematic view of a pin-to-pin overlap area and a pin-to-journal overlap area of the crankshaft of FIG. 1.
Figure 3:
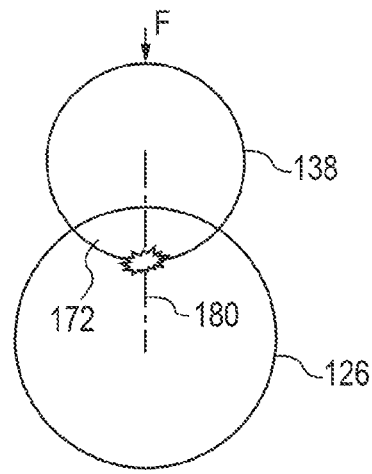
FIG. 3 is a schematic view of the crankshaft of FIG. 1 depicting stress concentration at a bottom of an overlap area and in the same plane as an applied load.
Figure 4:
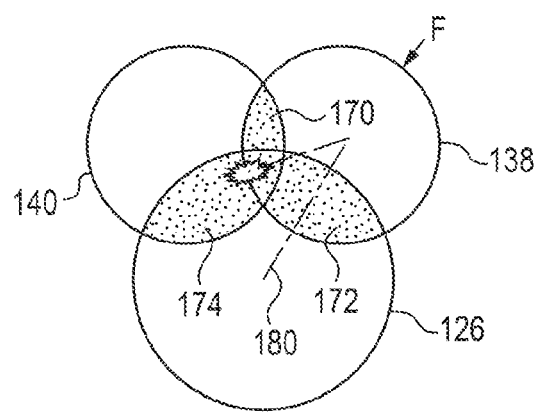
FIG. 4 is a schematic view of the crankshaft of FIG. 1 depicting stress concentration offset from a load plane and from a forging parting line.

As is well known, the stiffness and/or strength of a crankshaft, such as the exemplary middle web crankshaft 100, is generally dependent on an amount of respective overlap area that can be achieved for the crank pin journal-to-crank pin journal and the crank pin journal-to-main journal. However, for many crankshafts, these overlap areas are not balanced, which, in turn, can cause uneven stress concentration in the crankshaft. For example, FIG. 2 schematically depicts the crank pin journal-to-crank pin journal overlap area 170 and the crank pin journal-to-main journal overlap areas 172,174 associated with main journal 126 and crank pin journal 138, 140. FIG. 3 schematically depicts a load or force F applied to the crank pin journal 138 along a parting line/center axis 180 of the crankshaft 100. This applied force results in stress concentration at a bottom of the crank pin journal-to-main journal overlap areas 172 and in approximately the same plane as the applied force. FIG. 4 again schematically depicts the force F applied to the crank pin journal 138 along the parting line/center axis 180. The applied force also results in stress concentration offset from a load plane and from the parting line/center axis 180. To accommodate for these stress concentrations in the overlap areas, at least one of the first and second middle crank webs 152,164 of the exemplary crankshaft 100 has a stress relief forged therein.

Figure 5:
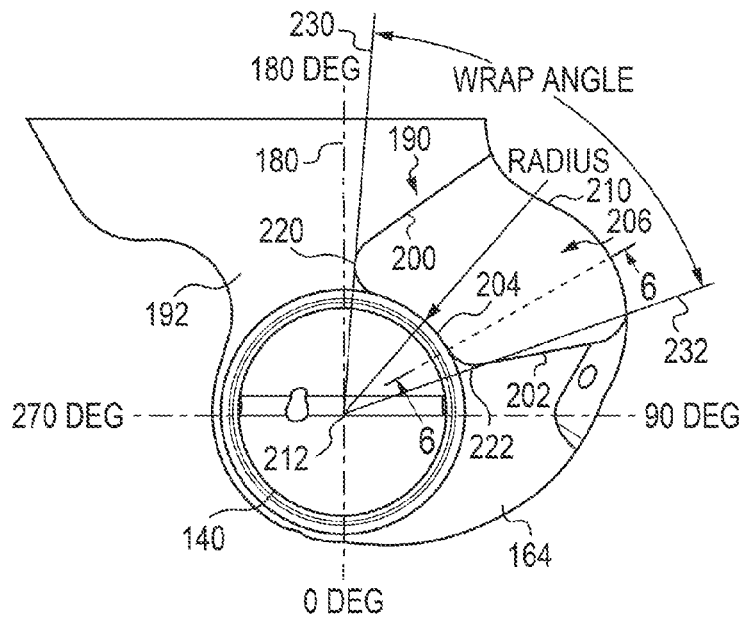
FIG. 5 is an enlarged view of the crank web of the crankshaft of FIG. 1 having the forged-in stress relief.
Figure 8:
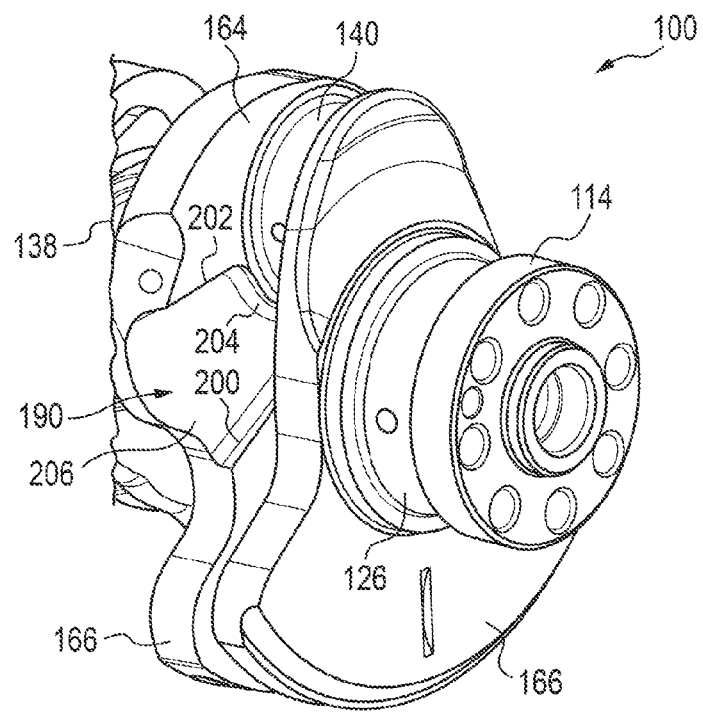
FIG. 8 is a partial side perspective view of the crank web of the crankshaft of FIG. 1 having the forged-in stress relief.
Figure 10:
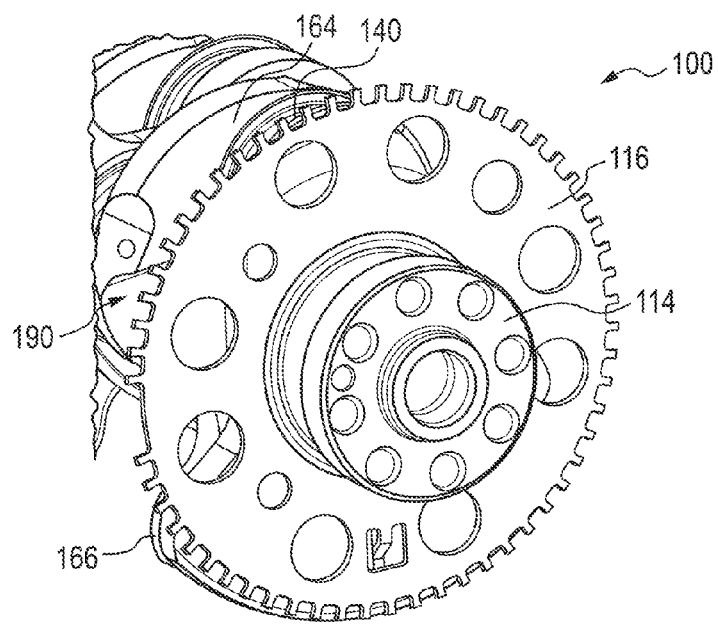
FIG. 10 is a perspective view of FIG. 9.

More particularly, FIG. 5 depicts a stress relief 190 forged in crank web 164, which again is located adjacent the second end 104 of the crankshaft 100. However, it should be appreciated that a stress relief can also be forged in crank web 152. As shown, the forged-in stress relief 190, which can be located in a side 192 of the crank web 164 facing the second end 104, is defined by first and second spaced sidewalls 200 and 202, an inner wall 204 and a substantially planar base wall 206. Each of the first sidewall 200 and second sidewall 202 extends generally radially from the neighboring crank pin journal 140 connected to the side 192 of the middle crank web 164 to an outer edge 210 of the crank web 164. The inner wall 204 is arcuate shaped and is substantially concentric with a central axis 212 of the neighboring crank pin journal 140, the radius of the inner wall being greater than or equal to a radius of the crank pin journal 140. In the depicted embodiment, the inner wall 204 is offset from an outer periphery of the crank pin journal 140. As best shown in FIGS. 8-10, the forged-in stress relief 190 is located in an overlap area defined by the neighboring crank pin journals 138,140. The forged-in stress relief 190 is also located in an overlap area defined by the main journal 126 and the neighboring crank pin journals 138,140. It should be appreciated that the shape of the forged-in stress relief 190 is controlled to reduce stress in the crankshaft 100 by controlling several key parameters of the stress relief, namely, depth, wrap angle, radius and undercut. In other words, the forged-in stress relief 190 having a predetermined depth, wrap angle, radius, and undercut which together define the shape of the forged-in stress relief. Each of these parameters can be optimized to achieve the best balance of stress at a base of the crank pin journal 140.

With reference back to FIG. 5, the forged-in stress relief 190 further includes a first arcuate portion 220 which defines a transition between the first sidewall 200 and the inner wall 204, and a second arcuate portion 222 which defines a transition between the second sidewall 202 and the inner wall 204. The wrap angle is an angular distance around the neighboring crank pin journal 140. This angular distance is measured from a first tangential line 230 (which extends from the central axis 212 of the pin journal 140 and is tangent to a radius defining the first arcuate portion 220) to a second tangential line 232 (which extends from the central axis 212 of the pin journal 140 and is tangent to a radius defining the second arcuate portion 222). However, it should be appreciated that a plane defined by each sidewall 200,202 is not oriented parallel to the respective first and second tangential lines, but is offset from the axis of the crank pin journal 140. Further, the first tangential line 230 is angularly spaced or offset from the parting line 180 defined by the crankshaft 100. In the exemplary embodiment, this offset is about 5 degrees. Although, it should be appreciated that the first tangential line 230 can be offset by more or less than 5 degrees. The first tangential line 230 can also extend up to the parting line 180 (i.e., can be approximately co-linear with the parting line 180), but should not extend past the parting line. The wrap angle is less than or equal to about 180 degrees, and should extend past a high stress area of the crankshaft 100 by about 10 degrees to allow for transition of stress into one of the sidewalls 200,202 of the stress relief 190.

Figure 6:
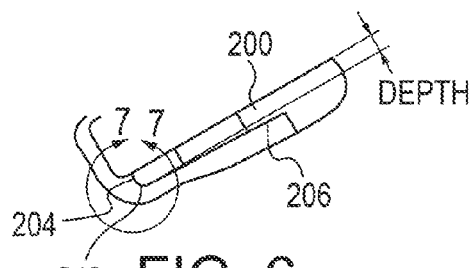
FIG. 6 is a partial cross-section view of the crank web of FIG. 5 taken along line 6-6 of FIG. 5.
Figure 7:
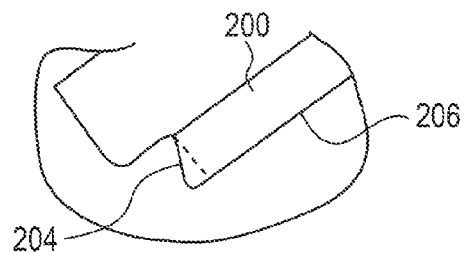
FIG. 7 is an enlarged view of a portion of FIG. 6 as identified by line 7-7 of FIG. 6.

Regarding the depth of the forged-in stress relief 190, and with reference to FIG. 6, a lower portion 240 of the inner wall 204 defines a radius, and the depth of the forged-in stress relief 190 is at least partially dependent on the size of this radius. As the radius increases the depth also increases to prevent stress concentration on the crank pin journal. The depth of the exemplary forged-in stress relief 190 located on the middle crank web 164 is less than or equal to about 65% of a thickness of the crank web 164, which is measured parallel to a rotational axis of the crankshaft 100. With respect to the undercut of the forged-in stress relief 190, and as depicted in FIG. 7, the undercut is provided at the intersection of the inner wall 204 and the base wall 206. For the exemplary forged-in stress relief 190, the undercut is less than or equal to about 45 degrees.

Figure 11:
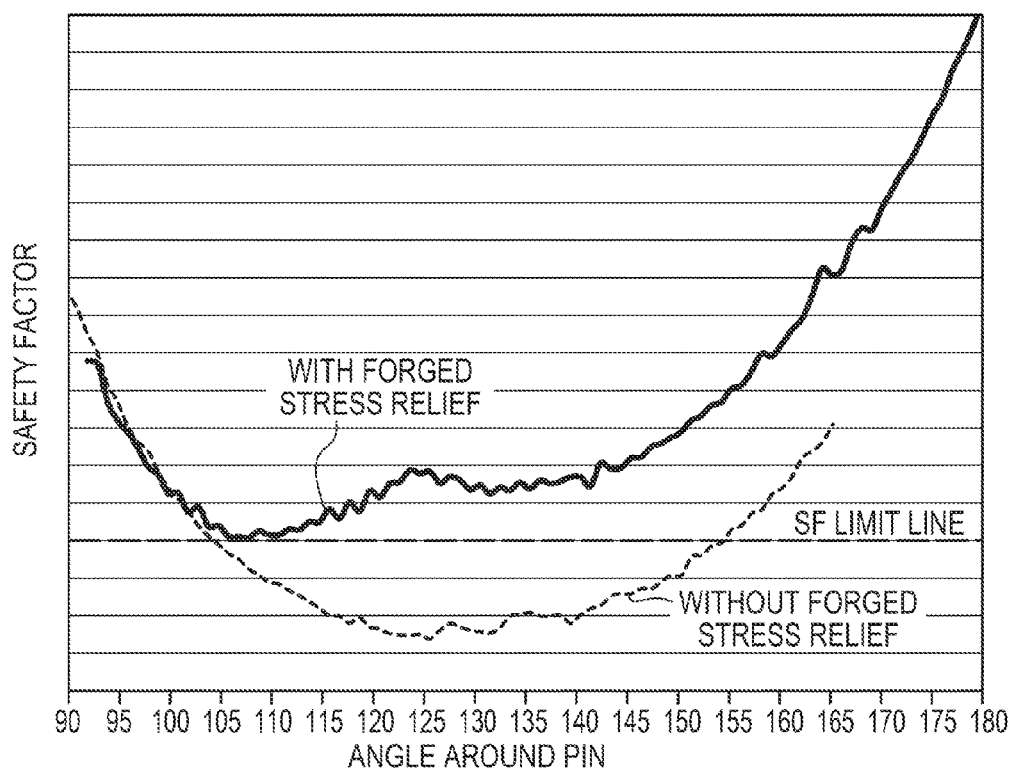
FIG. 11 is a graph illustrating respective safety factors of the crankshaft of FIG. 1 and a crankshaft devoid of a crank web having a forged-in stress relief.

FIG. 11 is a graph illustrating respective safety factors (i.e. fatigue factors) of the exemplary crankshaft 100 with the forged-in stress relief and a known crankshaft devoid of a crank web having a forged-in stress relief. As depicted, with a forged-in stress relief having a wrap angle of less than 180 degrees, the exemplary crankshaft 100 exceeds the safety factor limit. The crankshaft 100 has an increase in strength of approximately 20% as compared to the known crankshaft. Further, the forged-in stress relief 190 improves the stress across the entire wrap angle from 90 degrees to 180 degrees (see FIG. 5).

Figure 12:
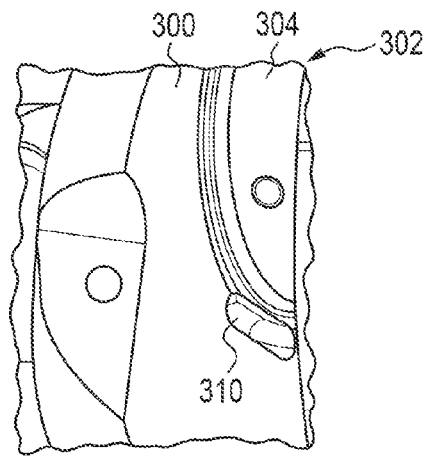
FIG. 12 is a partial perspective view of a known crankshaft having a crank web with a machined stress relief.
Figure 13:
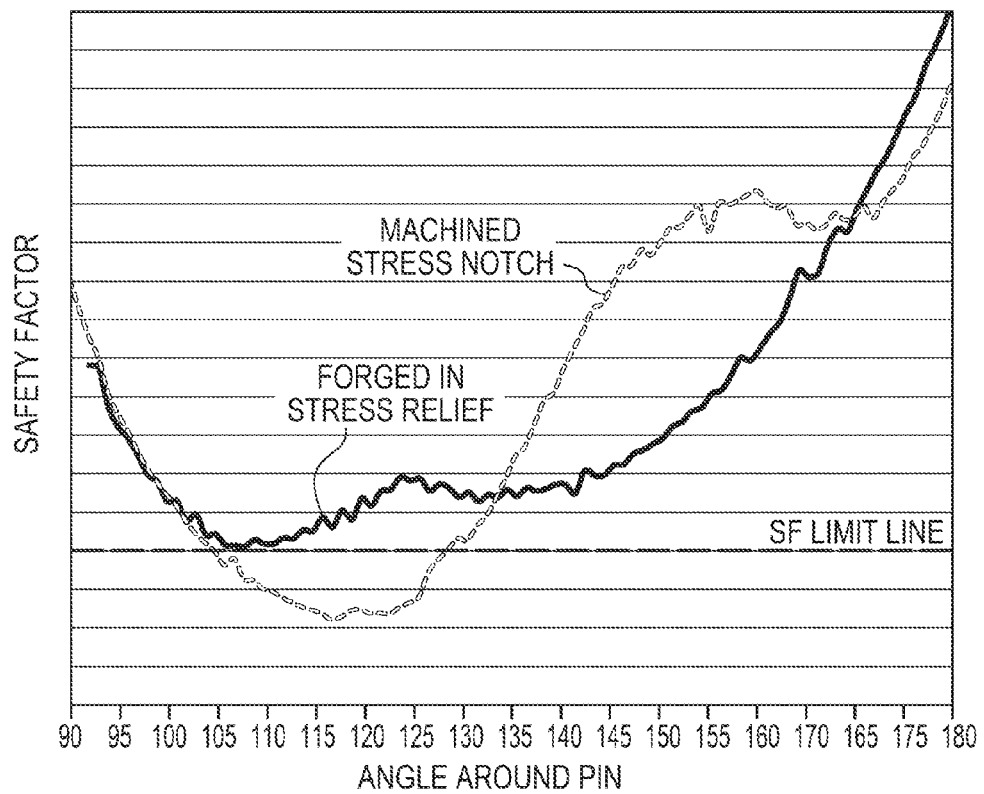
FIG. 13 is a graph illustrating respective safety factors of the crankshaft of FIG. 1 and the crankshaft of FIG. 12.

FIG. 12 depicts a portion of a middle web 300 of a known crankshaft 300. The crankshaft 300 includes a crank pin journal 304. The middle web 300 has a machined stress relief 310 located adjacent an outer periphery of the crank pin journal 304. This stress relief 310 is typically machined in a specific area of the middle web 300. As such, the stress relief 310 is only effective over a small area. This is best shown in FIG. 13, which is a graph illustrating respective safety factors of the exemplary crankshaft 100 and the known crankshaft 302. Again, the crankshaft 100 exceeds the safety factor limit. In contrast, the crankshaft 302 with the machined stress relief 310 located between 100 degrees and 130 degrees around the crank pin journal 304 fails to exceed the safety factor limit.

The present disclosure further provides a method of increasing bending and torsion strength of a forged crankshaft. The method comprising providing a forged-in stress relief on a crank web of the crankshaft which is located between and connecting two neighboring crank pin journals of the crankshaft; controlling a shape of the forged-in stress relief by controlling a depth, wrap angle, radius and undercut defined by the forged-in stress relief; and locating the forged in stress relief in an overlap area defined by the neighboring crank pin journals. The method further includes locating the forged-in stress relief in an overlap area defined by main journals of the crankshaft and the neighboring crank pin journals.

As is evident from the foregoing, the present disclosure provides for crankshaft 100 having a forged-in stress relief 190 that is forged into the crank web 164, for example, below the crank pin journal 140 that is undergoing high stress. The stress relief associated with this forged-in shape is controlled by depth, wrap angle, radius, and undercut of the stress relief 190. All four parameters can be optimized to achieve the best balance of stress at the base of the crank pin journal 140. The proposed forged-in stress relief 190 effectively reduces this stress in the crankshaft 100 and not just in one isolated area as the shape of the stress relief can be adjusted to cover a broader area. Further, because the forged-in stress relief 190 is forged into the crank web 164, there is no need for additional expensive machining. Applying the forged-in stress relief can significantly increase the crankshaft's strength which, in turn, reduces the need for increasing the crankshaft material to increase the strength of the crankshaft.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A forged crankshaft comprising:
   a first end adapted for connection to an associated pulley and a second end adapted for connection to an associated flywheel;
   a plurality of main journals;
   a plurality of crank pin journals rotatable in a circular path about axes defined by the main journals; and
   a plurality of crank webs, at least one crank web of the plurality of crank webs defining a middle crank web which is located between and connecting two neighboring crank pin journals of the plurality of crank pin journals, the middle crank web having a stress relief forged therein, the forged-in stress relief being defined by first and second spaced sidewalls, an inner wall and a base wall, the forged-in stress relief having a predetermined depth, wrap angle, radius, and undercut which together define a shape of the forged-in stress relief, wherein the shape of the forged-in stress relief is controlled to reduce stress in the crankshaft,
   wherein the forged-in stress relief is located in an overlap area defined by the neighboring crank pin journals.

2. The crankshaft of claim 1, wherein the depth of the forged-in stress relief is less than or equal to about 65% of a thickness of the middle crank web.

3. The crankshaft of claim 1, wherein the wrap angle is an angular distance around one of the neighboring crank pin journals that extends from a side of the middle crank web having the stress relief forged therein, the wrap angle being less than or equal to about 180 degrees.

4. The crankshaft of claim 3, wherein the wrap angle extends past a high stress area of the crankshaft by about 10 degrees to allow for transition of stress into one of the sidewalls of the stress relief.

5. The crankshaft of claim 1, wherein the inner wall is arcuate shaped to define a radius of the forged-in stress relief and is substantially concentric with one of the neighboring crank pin journals, the radius of the forged-in stress relief being greater than or equal to a radius of the one neighboring crank pin journal.

6. The crankshaft of claim 1, wherein the undercut of the forged-in stress relief is provided at the intersection of the inner wall and the base wall, the undercut being less than or equal to about 45 degrees.

7. The crankshaft of claim 1, wherein the forged-in stress relief is provided on a side of the middle web facing the one of the first and second ends of the crankshaft, and the inner wall of the forged-in stress relief is offset from an outer periphery of the neighboring crank pin journal connected to a side of the middle web having the stress relief.

8. The crankshaft of claim 1, wherein the forged-in stress relief is radially offset from a forged parting line defined by the crankshaft.

9. The crankshaft of claim 1, wherein the forged-in stress relief is located in an overlap area defined by the main journals and the neighboring crank pin journals.

10. The crankshaft of claim 1, wherein each of the first sidewall and second sidewall extends generally radially from the neighboring crank pin journal connected to a side of the middle web having the stress relief to an outer edge of the middle web, a plane defined by each sidewall being offset from an axis of a respective neighboring crank pin journal.

11. The crankshaft of claim 1, wherein the crankshaft having the forged-in stress relief has an increase in strength of approximately 20% as compared to a crankshaft without the forged-in stress relief.

12. A forged crankshaft comprising:
    a first end adapted for connection to an associated pulley and a second end adapted for connection to an associated flywheel;
    a plurality of main journals;
    a plurality of crank pin journals rotatable in a circular path about axes defined by the main journals; and a plurality of crank webs, one of the crank webs located adjacent the first end defining a first middle crank web and one of the crank webs located adjacent the second end defining a second middle crank web, each of the first and second middle crank webs being located between and connecting two neighboring crank pin journals of the plurality of crank pin journals, at least one of the first and second middle crank webs having a stress relief forged therein, the forged-in stress relief being defined by first and second spaced sidewalls, an inner wall and a base wall, the forged-in stress relief having predetermined parameters, the parameters being a depth of the stress relief, a wrap angle of the stress relief which is an angular distance the stress relief extends around the one of the neighboring crank pins connected to the middle crank web having the stress relief, a radius of the stress relief as defined by the inner wall, and an undercut of the stress relief which is provided at the intersection of the inner wall and the base wall, the parameters together defining a shape of the forged-in stress relief, wherein the forged-in stress relief is located in both an overlap area defined by the neighboring crank pin journals, and an overlap area defined by the main journals and the neighboring crank in journals.

13. The crankshaft of claim 12, wherein the depth of the forged-in stress relief is less than or equal to about 65% of a thickness of the middle crank web having stress relief.

14. The crankshaft of claim 12, wherein the wrap angle is less than or equal to about 180 degrees, and extends past a high stress area of the crankshaft by about 10 degrees.

15. The crankshaft of claim 12, wherein the radius of the inner wall is greater than or equal to a radius of the neighboring crank pin journals extending from a side of the middle crank web having the stress relief.

16. The crankshaft of claim 12, wherein the undercut is less than or equal to about 45 degrees.

* * * * *